May 26, 1953  D. B. HULL  2,640,099
HEARING AID TEST STRUCTURE
Filed July 31, 1948
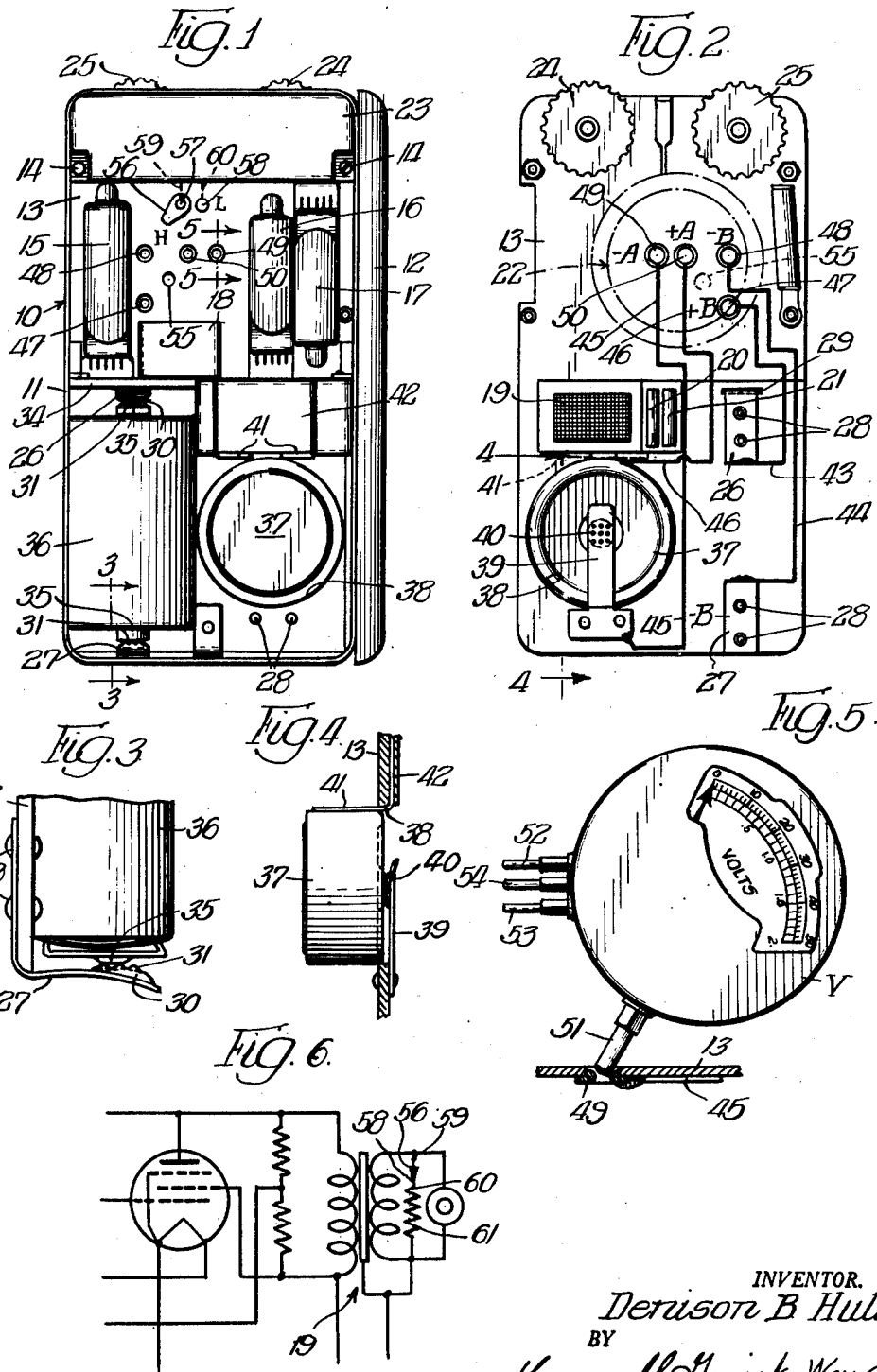
INVENTOR.
Denison B Hull,
BY
Cromwell, Greist + Warden
Attys.

Patented May 26, 1953

2,640,099

UNITED STATES PATENT OFFICE 2,640,099

HEARING AID TEST STRUCTURE

Denison B. Hull, Winnetka, Ill., assignor to Otarion, Inc., Chicago, Ill., a corporation of Illinois Application July 31, 1948, Serial No. 41,752

2 Claims. (Cl. 175—183)

The present invention relates to certain improvements in hearing aid construction whereby the maintenance and use of these instruments are facilitated and their operation is improved and whereby a given instrument is adapted to varying or different hearing tolerances, depending upon the degree of hearing impairment of the user or his wishes in the matter of comfort. More particularly, these improvements include a novel plug-in meter arrangement built into the hearing aid, whereby the condition of batteries of the instrument may be readily and quickly ascertained, and a device for adjustably limiting the power output at the earpiece of the instrument as the tolerance level of the particular user may dictate.

The operation of testing the voltage condition of the usual "A" and "B" batteries of small, portable, hearing aid instruments is quite an involved and awkward one, if attempted by an inexperienced user without the assistance of special equipment. Voltmeters calibrated to afford readings of hearing aid "A" and "B" battery voltages are available, however in order to apply the usual test prongs of such a meter to the respective battery poles, one must use one hand for holding the meter and for applying certain of its terminals to one of the battery terminals, while at the same time employing the other hand to complete the test circuit at the other battery terminal or ground. The instrument under test must also be held from movement while this is being done. The positional relationship of the meter test prongs and the arrangement of the battery terminals to be contacted thereby are ordinarily such as to render this testing procedure a distinctly awkward one, particularly for the unskilled person. Accordingly, it is very desirable to provide some means which is built into the hearing aid, hence is constantly available, whereby to conveniently, quickly and with reliable accuracy ascertain the condition of the batteries of the instrument, both in the field and at any desired time, without requiring one to bring the instrument to the shop for testing.

It is also advantageous to provide means enabling the user to selectively limit the ceiling of acoustical power reaching his ear, in addition to the usual manual volume and tone controls of the hearing aid. Although peak clipping devices have been proposed and used for this purpose, I am unaware of any which affords the degree of convenience and the feature of optional control which are available in the instrument hereinafter described. A simple manipulation of a switch element on the hearing aid chassis enables the user to drop the maximum sound output beneath his threshold of discomfort.

I have also observed that inexperienced users frequently have difficulty, when attempting to replace batteries in the hearing aid or to install new batteries, in securing an effective, electrically conductive engagement of the battery poles with the corresponding contact terminals on the hearing aid chassis. Accordingly, an improvement of the instrument which enables quick and easy replacement of batteries, while insuring a proper connection thereof in the hearing aid circuit, is a feature of the invention which is of considerable practical importance.

It is therefore one of the objects of the invention to provide an inexpensive, extremely simple arrangement of test means on the chassis of the hearing aid, operatively wired with the battery contacts of the instrument and adapted for the reception of the test prongs of a conventional type of voltmeter, without requiring a complicated and aggravating manipulation by the user of the meter, its contacts and the hearing aid itself.

Yet another object is to provide such a built in meter plug-in structure which is extremely compact so as to occupy little more space than the thickness of the chassis itself, yet which is quickly and conveniently accessible for application of a standard type voltmeter thereto, merely upon the opening of the hearing aid casing.

Still another object is to provide an arrangement of meter plug-in contact sockets which are adapted to be quickly and inexpensively applied to the hearing aid chassis in the manufacture thereof in permanently wired relation to the respective plus and minus chassis terminals for the "A" and "B" batteries of the instrument, without enlarging the overall dimensions of the chassis assembly in the slightest.

In another aspect, it is a further object of the invention to provide a hearing aid which is characterized by an improved output limiting circuit whereby the maximum decibel output of the instrument may be suited to the hearing tolerance and comfort of the user.

A more specific object is to provide a simple adjustable output circuit for a hearing aid which functions in the manner of a peak clipping device, including a shunt resistor adapted to be selectively cut across the secondary transformer output coil of the instrument, thereby to regulate the maximum decibel or power output in accordance with the threshold of discomfort of the user.

Again, it is an object of the invention to provide a power output regulator of the type referred to in the preceding paragraph, characterized by a manual control or switching element which is conveniently mounted on the chassis of the hearing aid, preferably adjacent the chassis test contacts referred to above, and is readily accessible to the user upon opening of the instrument casing.

It is a still further specific object of the invention to provide a hearing aid construction including improved resilient battery contact elements mounted on the chassis thereof, said elements being specially shaped to insure unfailing conductive engagement with the respective poles of the "A" and "B" batteries of the instrument, yet being quickly and easily engaged with and disengaged from said poles when it is desired to remove or replace the batteries.

A still further object of the invention concerns the provision of a novel chassis mounting arrangement for receiving a cylindrical, drum-like type of "A" battery in its operative relation to certain contacts which are fixedly mounted on said chassis.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 1 is a view in front elevation illustrating a hearing aid incorporating the improvements of the present invention, the front casing member of the instrument being in open position to enable a view of the instrument chassis and various electrical components of the instrument which are mounted on said chassis;

Fig. 2 is a rear elevational view of the chassis when removed from the casing, illustrating the battery test wiring for the meter test sockets of the invention, certain of the electrical components of the instrument which do not constitute part of the invention being omitted or illustrated only schematically or by dot-dash lines;

Fig. 3 is an enlarged fragmentary view in vertical cross section along a line corresponding generally to line 3—3 of Fig. 1, illustrating specific structural details of one of the improved resilient battery contacts according to the invention;

Fig. 4 is a view in cross section along line 4—4 of Fig. 2;

Fig. 5 is an enlarged cross sectional view, taken approximately along line 5—5 of Fig. 1, illustrating the manner of testing the hearing aid batteries, as contemplated by the invention; and Fig. 6 is a fragmentary wiring diagram illustrating a power limiting device, incorporated in the output circuit of the instrument.

Referring to the drawings, the reference numeral 10 generally designates the stamped sheet metal or molded plastic casing of the hearing aid, which consists of a rear section 11 having a front section 12 hinged to one side thereof. An insulating fiber chassis 13 is secured in the rear section of the casing by means of small screws 14, which chassis has various electrical and electronic components of the hearing aid mounted thereon.

Since the invention does not reside particularly in these components, nor their relationship or the particular wiring thereof, certain thereof are omitted for clarity of illustration, and it will suffice to describe others thereof only in the most general sort of way. Thus, the reference numerals 15, 16, 17 designate standard, sub-miniature electronic tubes which are connected in staged relation in the hearing aid circuit in a conventional manner; the reference numeral 18 denotes a standard condenser, and the reference numeral 19 the output transformer. The elements designated 20 and 21 are resistors. Certain other resistors and condensers have been omitted, since they are conventional in all respects, and their presence would only tend to obscure the disclosure. A conventional circular, resiliently mounted microphone is illustrated in dot-dash lines in Fig. 2 and designated by the reference numeral 22. This microphone is normally secured to the chassis 13 over a portion of the wiring or connections shown in that figure, being disposed on the side of the chassis facing the viewer in Fig. 2.

Volume and tone control elements are enclosed in the partial chassis cover 23 appearing in Fig. 1 and the finger control dials 24, 25 project marginally from the chassis, being accessible externally of the casing 10 for manipulation by the user. The foregoing components are all generally conventional in hearing aid instruments of the type under consideration.

Referring to Figs. 1, 2 and 3, the opposed, upper and lower resilient "B" battery contacts 26, 27 are secured to the chassis 13 in vertically spaced relation to one another. These elements are of L-shaped cross section, one leg thereof being secured by rivets 28 to the rear of the chassis. The other leg projects forwardly of the chassis, through an opening 29 therein (in the case of the contact 26) and around the bottom of the chassis (in the case of the contact 27). These spring contact fingers terminate at their free ends in noses 30 which are embossed or roughened to afford a number of projecting, spaced contact nibs 31, as illustrated in Fig. 3. The noses 30 extend forwardly beneath a horizontal front shelf portion 34 of the chassis and are adapted to engage the opposite poles or terminals 35 of the standard "B" battery 36, as illustrated in Fig. 1. The embossing of the aforesaid terminal noses insures a ready and unfailingly efficient engagement of the respective spring contacts 26, 27 with the battery terminals 35, notwithstanding possible misalignment of "B" battery 36 in the space forwardly of the instrument chassis in which it is disposed.

The reference numeral 37 designates a conventional type of cylindrical "A" battery or cell in general accordance with the patent to Ruben No. 2,422,045, of June 10, 1947. This battery is characterized, insofar as the present invention is concerned, by a cylindrical metallic casing which serves as its positive pole, and by a central, negative axial pole.

The chassis 13 is provided with a circular aperture 38 concentrically receiving cell 37 and a spring contact 39 is riveted on the chassis, which contact is embossed (like contact noses 30) at 40 adjacent the axis of opening 38 for electrically conductive engagement with the aforesaid negative "A" battery pole. Contact with the positive pole, i. e., the periphery of the cell casing, is established by a pair of forwardly extending spring contact fingers 41 which are appropriately secured to the instrument chassis. They are covered by a protective insulating plate 42.

The respective battery contacts 26, 27, 39 and 41 have the wire conductors 43, 44, 45 and 46 soldered thereto, by which conductors the said contacts are connected to the respective voltmeter test sockets 47, 48, 49 and 50 on the chassis, as illustrated in Figs. 1, 2 and 5. These sockets may be in the form of small metal grommets fixedly fitted in apertures through the chassis 13. They are adapted to serve as contact seats which are abutted by the test prongs of a standard hearing aid voltmeter illustrated conventionally in Fig. 5 and designated by the reference character V, in the testing of the batteries 36, 37. This voltmeter has two sets of test prongs. One set consists of two prongs 51, which are aligned with one another in a diametral plane through the axis of voltmeter V, and which are for the purpose of testing the "A" battery voltage. In use, these prongs are disposed in contacting relation to the test sockets 49, 50, thereby completing a simple voltage test circuit through the conductor 45, the chassis battery contact 39, "A" battery 37, chassis contact 41, the conductor 46, test socket 50, the meter V, and socket 49. The other set of test prongs comprises three prongs 52, 53, 54 of which the last named is a dummy adapted to engage merely in a suitable guide depression 55 of the chassis to facilitate aligning the meter. The prongs 52, 53 are adapted to contact the sockets 48, 47 respectively. This establishes a "B" battery test circuit through the conductor 43, chassis battery contact 26, "B" battery 36, chassis contact 27, conductor 44, socket 48, meter V, and socket 47.

The meter V includes a dial suitably calibrated in terms of "A" and "B" battery voltages and a coacting needle; accordingly, upon placement of either of the respective sets of test prongs in engagement with the chassis test sockets in the fashion described above, it is conveniently possible to obtain an accurate meter reading of the battery voltage in question. This may be done using a single hand and requires no difficult or awkward manipulation, such as is ordinarily necessary in testing battery voltages. The test sockets are accessible directly upon opening of the instrument casing cover 12. The hearing aid is held in one hand and the meter in the other.

The instrument also includes means for adjusting the maximum decibel output to suit the hearing tolerance and comfort of the user, plus convenient control means therefor which are also mounted on the instrument chassis for equally easy and convenient manipulation. Such means include a small switch 56 which is pivotally mounted on the chassis by means of a conducting pin 57 (see Fig. 1). A fixed contact terminal 58 is mounted on the chassis for engagement by said switch 56 when the latter is swung counterclockwise from the full power position illustrated in Fig. 1, designated by the character H. Conductors 59, 60 are connected respectively to the switch element 56 (through its conducting pivot pin 57) and to the fixed contact 58. A resistor 61 of suitable value, for example 18 ohms or so, is connected in shunt across the secondary coil of the output transformer of the hearing aid (see Fig. 6), when the switch element 56 is in contact making position, denoted L. In this position the power output is dropped substantially as compared to the open position H of the switch in which the resistor 61 is cut out of the circuit, for full decibel output. A spread of about 6 db is made possible by this regulation, assuming a transformer output voltage of 15 volts R. M. S. and a value of 18 ohms for resistor 61.

The above provisions operate as a type of peak clipping device to limit the ceiling of acoustical power output to reach the user's ear. He is therefore enabled to suit the instrument to his auditory tolerance level under differing circumstances. Coupled with the selective battery test arrangement on the instrument chassis, this selective output control feature presents substantially increased convenience in testing and adjusting the hearing aid to the taste or comfort of the user.

I claim:

1. A portable hearing aid structure comprising an insulating chassis, sets of battery terminal contacts mounted on said chassis for engagement with plus and minus "A" and "B" battery poles, respectively, two unlike sets of electrically conductive contact elements secured on said chassis, each set comprising a plurality of contact elements, and wiring connecting the contact elements of each of the respective sets with the respective "A" and "B" battery terminal contacts, said contact elements being engageable in electrically conducting relation by unlike sets of contact members of a meter.

2. A portable hearing aid structure comprising an insulating chassis, sets of battery terminal contacts mounted on said chassis for engagement with plus and minus "A" and "B" battery poles, respectively, two unlike sets of electrically conductive contact elements secured on said chassis, each set comprising a plurality of contact elements which are arranged in the respective sets in different spacing relative to one another, and wiring connecting the contact elements of each of the respective set with the respective "A" and "B" battery terminal contacts, said contact elements being engageable in electrically conducting relation by unlike sets of differently arranged contact members of a meter.

DENISON B. HULL.

References Cited in the file of this patent

UNITED STATES PATENTS

| Number | Name | Date |
| --- | --- | --- |
| 837,534 | Babcock | Dec. 4, 1906 |
| 964,995 | Marko | July 19, 1910 |
| 1,610,304 | Mabie | Dec. 14, 1926 |
| 1,734,220 | Mac Gahan et al. | Nov. 5, 1929 |
| 2,021,877 | Kolkmann | Nov. 19, 1935 |
| 2,277,605 | Palitzsch | Mar. 24, 1942 |
| 2,390,794 | Knight | Dec. 11, 1945 |
| 2,395,318 | Cubert | Feb. 19, 1946 |
| 2,406,583 | Blauvelt | Aug. 27, 1946 |
| 2,424,422 | Tresise et al. | July 22, 1947 |
| 2,450,657 | Guernsey | Oct. 5, 1948 |
| 2,482,288 | Posen | Sept. 20, 1949 |